Figure 1:
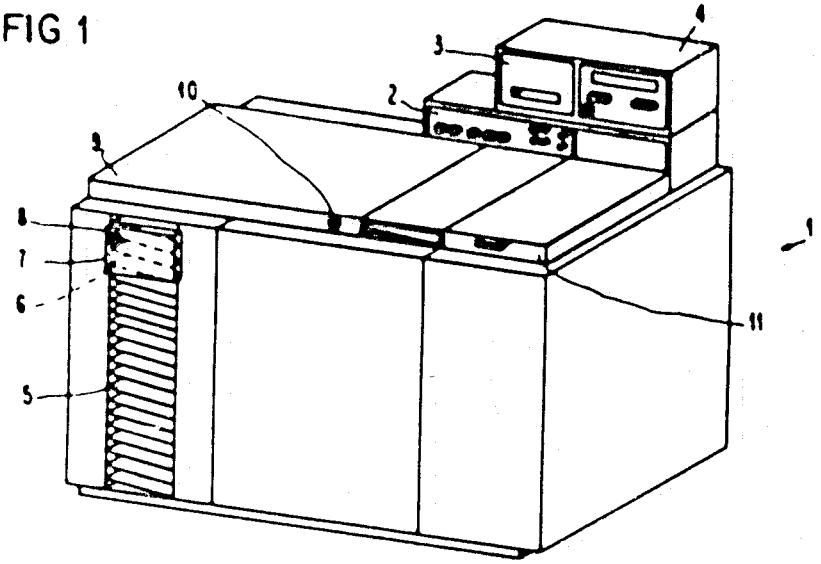
Figure 2:
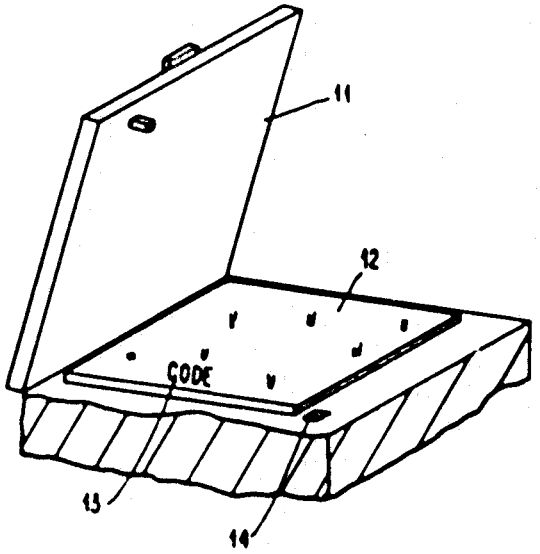

United States Defensive Publication [19] (H) [11] T102,102

Bolle et al. [43] Aug. 3, 1982

[54] ACCESS CONTROLLED COPIER

[76] Inventors: Albert Bolle, Schurwaldstr. 7, 7300 Berkheim, Esslingen; Karl-Heinz Jaksch, Danziger Str. 7, 7033 Herrenberg, both of Fed. Rep. of Germany

[21] Appl. No.: 243,978

[22] Filed: Mar. 16, 1981

[30] Foreign Application Priority Data

Jun 7, 1980 [DE] Fed. Rep. of Germany ..... 3021504

[51] Int. Cl.[1] ..... G03G 15/00

[52] U.S. Cl. ..... 355/14 R; 355/14 SH; 271/298

[57] ABSTRACT

One or more collator/sorter bins at a copier output are locked to the user by means of a badge reader or the like. The user enters identification data into the copier to enable copier operation. Machine controls precede copy run by latching the document platen cover and displaying user-entered identification data in a manner so that it is recorded on the first copy which is delivered to the locked collator/sorter bin or bins. The number of copies selected by the user are then processed and delivered to user-accessible bins. The platen cover is thereafter unlatched to allow user recovery of the original document.

8 Claims, 1 Sheet Drawing,

10 Pages Specification

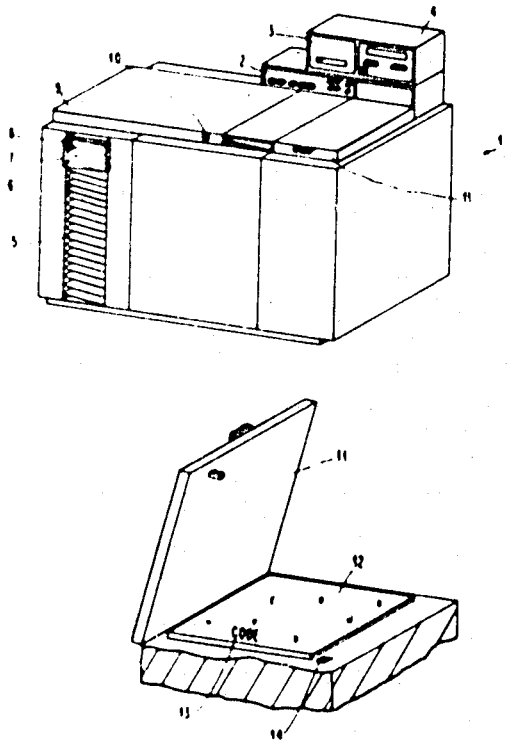

The file of this unexamined application may be inspected and copies thereof may be purchased (849 O.G. 1221, Apr. 9, 1968).